United States Patent
Taylor

(10) Patent No.: US 11,200,232 B2
(45) Date of Patent: *Dec. 14, 2021

(54) QUERYING A NOT ONLY STRUCTURED QUERY LANGUAGE (NOSQL) DATABASE USING STRUCTURED QUERY LANGUAGE (SQL) COMMANDS

(71) Applicant: salesforce.com, inc., San Francisco, CA (US)

(72) Inventor: James Taylor, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/553,067

(22) Filed: Aug. 27, 2019

(65) Prior Publication Data

US 2019/0384764 A1 Dec. 19, 2019

Related U.S. Application Data

(63) Continuation of application No. 14/133,431, filed on Dec. 18, 2013, now Pat. No. 10,496,640.

(60) Provisional application No. 61/739,101, filed on Dec. 19, 2012.

(51) Int. Cl.
*G06F 16/2453* (2019.01)
(52) U.S. Cl.
CPC .............. *G06F 16/24534* (2019.01)
(58) Field of Classification Search
USPC ........................................................ 707/722
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,884,299 A * | 3/1999 | Ramesh | G06F 16/24556 |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

OTHER PUBLICATIONS

Dean, Jeffrey, and Sanjay Ghemawat. "Map Reduce: simplified data processing on large clusters." Communications of the ACM 51.1 (2008): 107-113.

(Continued)

*Primary Examiner* — Muluemebet Gurmu
(74) *Attorney, Agent, or Firm* — Kwan & Olynick LLP

(57) ABSTRACT

Techniques for querying a Not-Only/Non Structured Query Language (NoSQL) database using Structure Query Language (SQL) commands. A SQL query is received. The SQL query is transformed into one or more non-relational database scans having associated row key ranges. The one or more non-relational database scans are executed in parallel for each row key range. The results from the parallel scans of the non-relational database are combined. The combined results are presented as results of the SQL query.

20 Claims, 8 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,197,520 B1 | 3/2007 | Matthews et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,958,159 B1 | 6/2011 | Tran et al. |
| 9,104,762 B1 | 8/2015 | Ward |
| 9,143,341 B2 | 9/2015 | Harrang et al. |
| 9,785,643 B1 | 10/2017 | Patil et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0038313 A1 | 3/2002 | Klein et al. |
| 2002/0042264 A1 | 4/2002 | Kim |
| 2002/0042843 A1 | 4/2002 | Diec |
| 2002/0069077 A1 | 6/2002 | Brophy et al. |
| 2002/0072951 A1 | 6/2002 | Lee et al. |
| 2002/0082892 A1 | 6/2002 | Raffel et al. |
| 2002/0087552 A1 | 7/2002 | Applewhite et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120625 A1 | 6/2003 | Jackson et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229610 A1 | 12/2003 | Treeck |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0149718 A1 | 7/2005 | Berlin |
| 2009/0177744 A1 | 7/2009 | Marlow et al. |
| 2009/0222404 A1 | 9/2009 | Dolin et al. |
| 2010/0121941 A1 | 5/2010 | Harrang et al. |
| 2010/0287346 A1 | 11/2010 | Schreter |
| 2011/0258178 A1 | 10/2011 | Eidson et al. |
| 2011/0258225 A1* | 10/2011 | Taylor ............... G06F 16/2272 707/769 |
| 2011/0282839 A1 | 11/2011 | Paksoy et al. |
| 2011/0295839 A1 | 12/2011 | Collins et al. |
| 2012/0179762 A1 | 7/2012 | Arora et al. |
| 2012/0310878 A1 | 12/2012 | Vuksan et al. |
| 2014/0149400 A1* | 5/2014 | Fu ..................... G06F 16/24564 707/723 |
| 2014/0164318 A1 | 6/2014 | Tsai et al. |
| 2014/0172914 A1 | 6/2014 | Elnikety et al. |
| 2014/0337276 A1 | 11/2014 | Iordanov |
| 2015/0134626 A1 | 5/2015 | Theimer et al. |

OTHER PUBLICATIONS

Erickson, Gail, Lubor Kollar, and Jason Ward. "Improving Performance with SOL Server 2000 Indexed Views." Microsoft Tech Net, Sep. (2000). (Year:2000).

Erickson, Gail, Lubor Kollar, and Jason Ward. "Improving Performance with SOL Server 2000 Indexed Views." Microsoft TechNet, Oct. (2008).

Final Office Action for U.S. Appl. No. 14/133,431 dated Apr. 22, 2016, 15 pages.

Final Office Action for U.S. Appl. No. 14/133,431 dated Aug. 25, 2017, 19 pages.

Final Office Action for U.S. Appl. No. 14/542,342 dated Aug. 28, 2017, 8 pages.

Final Office Action for U.S. Appl. No. 14/542,342 dated Dec. 11, 2018, 5 pages.

Final Office Action for U.S. Appl. No. 14/542,348 dated Sep. 25, 2017, 18 pages.

(56) References Cited

OTHER PUBLICATIONS

Final Office Action for U.S. Appl. No. 14/542,353 dated Oct. 23, 2017, 11 pages.
Final Office Action for U.S. Appl. No. 14/542,353 dated Sep. 14, 2018, 13 pages.
Final Office Action for U.S. Appl. No. 14/542,353 dated Sep. 9, 2019, 13 pages.
Final Office Action for U.S. Appl. No. 14/542,357 dated Feb. 27, 2018, 12 pages.
Final Office Action for U.S. Appl. No. 14/542,357 dated May 4, 2017, 13 pages.
Final Office Action for U.S. Appl. No. 14/542,338 dated Nov. 6, 2017, 17 pages.
Final Office Action for U.S. Appl. No. 14/542,338 dated Sep. 7, 2018, 18 pages.
Non-Final Office Action for U.S. Appl. No. 14/133,431 dated Aug. 26, 2015, 13 pages.
Non-Final Office Action for U.S. Appl. No. 14/133,431 dated Feb. 13, 2017, 16 pages.
Non-Final Office Action for U.S. Appl. No. 14/133,431 dated Feb. 26, 2018, 18 pages.
Non-Final Office Action for U.S. Appl. No. 14/133,431 dated Oct. 5, 2018, 21 pages.
Non-Final Office Action for U.S. Appl. No. 14/542,342 dated Jan. 9, 2017, 6 pages.
Non-Final Office Action for U.S. Appl. No. 14/542,342 dated May 14, 2018, 5 pages.
Non-Final Office Action for U.S. Appl. No. 14/542,348 dated Feb. 15, 2017, 13 pages.
Non-Final Office Action for U.S. Appl. No. 14/542,353 dated Apr. 4, 2017, 12 pages.
Non-Final Office Action for U.S. Appl. No. 14/542,353 dated Mar. 22, 2019, 15 pages.
Non-Final Office Action for U.S. Appl. No. 14/542,353 dated Mar. 9, 2018, 11 pages.
Non-Final Office Action for U.S. Appl. No. 14/542,357 dated Aug. 28, 2017, 12 pages.
Non-Final Office Action for U.S. Appl. No. 14/542,357 dated Jan. 9, 2017, 10 pages.
Non-Final Office Action for U.S. Appl. No. 16/112,538 dated Sep. 16, 2019, 23 pages.
Non-Final Office Action for U.S. Appl. No. 14/542,338 dated Feb. 1, 2017, 14 pages.
Non-Final Office Action for U.S. Appl. No. 14/542,338 dated Mar. 13, 2018, 24 pages.
Notice of Allowance for U.S. Appl. No. 14/133,431 dated Jun. 13, 2019, 14 pages.
Notice of Allowance for U.S. Appl. No. 14/133,431 dated Sep. 24, 2019, 14 pages.
Notice of Allowance for U.S. Appl. No. 14/542,342 dated May 22, 2019, 7 pages.
Notice of Allowance for U.S. Appl. No. 14/542,348 dated May 9, 2018, 9 pages.
Notice of Allowance for U.S. Appl. No. 14/542,357 dated Aug. 27, 2018, 9 pages.
Shook, Adam, and Donald Miner. MapReduce Design Patterns. "O'Reilly Media, Inc.", (2012): Chapter 4.
Notice of Allowance for U.S. Appl. No. 14/542,353 dated Dec. 18. 2019, 19 pages.
Notice of Allowance for U.S. Appl. No. 16/112,538 dated Jan. 8, 2020, 9 pages.
Non-Final Office Action for U.S. Appl. No. 16/883,810 dated Jul. 9, 2021, 17 pages.
Non-Final Office Action for U.S. Appl. No. 16/853,572 dated Jul. 23, 2021, 23 pages.
Non-Final Office Action for U.S. Appl. No. 16/442,409 dated May 26, 2021, 6 pages.

\* cited by examiner

QUERYING A NOT ONLY STRUCTURED QUERY LANGUAGE (NOSQL) DATABASE USING STRUCTURED QUERY LANGUAGE (SQL) COMMANDS

PRIORITY AND RELATED APPLICATION DATA

This application is a continuation of, and claims priority to, U.S. patent application Ser. No. 14/133,431, filed on Dec. 18, 2013, entitled "Querying a Not Only Structured Query Language (NOSQL) Database using Structured Query Language (SQL) Commands," which claims priority to Provisional U.S. Patent App. No. 61/739,101, filed on Dec. 19, 2012, entitled "Querying a NoSQL Database using SQL Commands," both of which are incorporated herein by reference in their entirety and for all purposes.

TECHNICAL FIELD

Embodiments relate to database management. More particularly, embodiments relate to techniques for querying a non-Structure Query Language (SQL) database using SQL commands.

BACKGROUND

Any subject matter discussed herein should not be assumed to be prior art merely as a result of its mention in the background section. Similarly, a problem mentioned in the background section or associated with the subject matter of the background section should not be assumed to have been previously recognized in the prior art.

Structured Query Language (SQL) is a programming language for managing data stored in relational databases. SQL consists of a data definition language and a data manipulation language. The scope of SQL includes data insert, query, update and delete, schema creation and modification, and data access control.

Some database applications are as well suited for SQL databases, for example, real-time decision making based on dynamic events (e.g., trends, fraud detection, enterprise security, inventory controls). Thus, Non (or Not Only) SQL databases exist. These different database architectures have associated advantages and disadvantages. There may be situations in which support of both database types and/or a merger of database functionality/interfaces may be beneficial.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In a multi-tenant database environment, the concept of "product metrics" may be supported based on mining of database usage information (e.g., by organization, by feature, by date). In one embodiment, database logs and/or aggregated usage information can be stored on a non-relational database, for example, Apache HBase, which is an open source non-relational distributed database. Other databases can also be supported. In one embodiment, a JAVA® Database Connectivity (JDBC) driver can be utilized to support low-latency SQL queries to run over the data stored in the non-relational database (e.g., HBase).

In contrast to turning SQL queries into batch-oriented map/reduce jobs, the techniques described herein can be utilized to transform the SQL queries into a set of HBase (or other non-relational database) scans that can be executed in parallel for each row key range. In one embodiment, these scans are executed in parallel for each row key range and can be combined to provide results of the query. As a result, the latency of the queries is low enough to allow data to drive analytic-type queries over large amounts of data. In one embodiment, all this is hidden behind a JDBC driver. In one embodiment, the user provides a schema for their database table data and a SQL query. In one embodiment, column values can be mapped to individual KeyValues and/or combined together in a single KeyValue to reduce the size of data, which can improve read speed.

In one embodiment, the functionality described herein as a query agent with a JDBC application programming interface (API) from the perspective of a client device. The query agent operates to translate a SQL query (e.g., passed through as a string in the JDBC API) into a series of "native" NoSQL store APIs. In one embodiment, the API to the NoSQL store is at a lower level, so the techniques described herein allow a higher-level query language (e.g., SQL) to be used to read/write data and manage schemas. Various architectures are provided in the description that follows.

Figure 1:
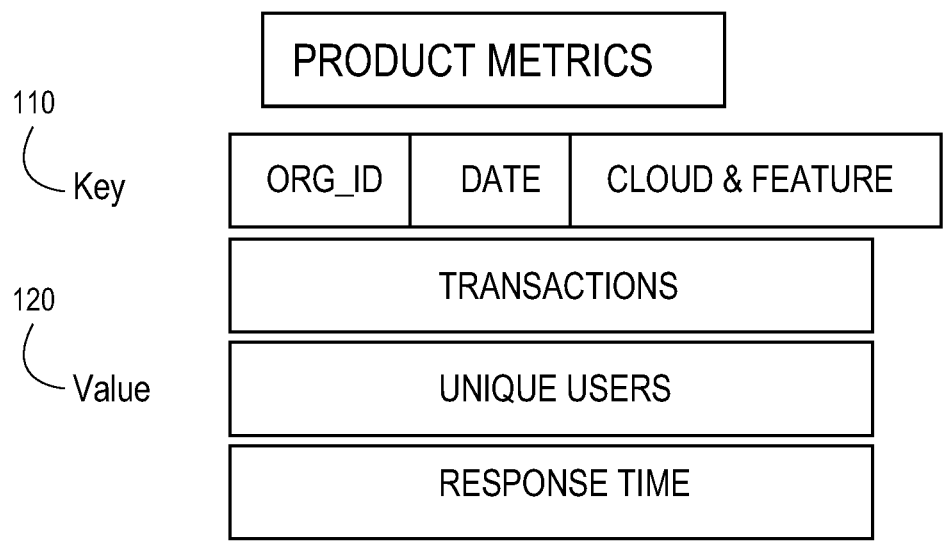
FIG. 1 is a conceptual diagram of a query that can be processed as described herein.

FIG. 1 is a conceptual diagram of a query that can be processed as described herein. The example of FIG. 1 is directed to product metrics; however, the techniques are equally applicable to other queries. That is, other types of queries to NoSQL databases can be performed in response to SQL commands.

The example of FIG. 1 can be based on the following product metrics schema:

```
<table name="PRODUCT_METRICS">
    <pkColumns>
        <pkColumn>
            <column name="ORGANIZATION_ID" sqlType="CHAR" maxLength="15"/>
        </pkColumn>
        <pkColumn>
            <column name="FEATURE" sqlType="CHAR" maxLength="1"/>
        </pkColumn>
        <pkColumn>
            <column name="DATE" sqlType="DATE" maxLength="8"/>
        </pkColumn>
    </pkColumns>
    <columnFamilies>
        <columnFamily name="1">
            <column name="TRANSACTIONS" sqlType="INTEGER" nullable="true"/>
            <column name="UNIQUE_USERS" sqlType="INTEGER" nullable="true"/>
            <column name="CPU" sqlType="INTEGER" nullable="true"/>
        </columnFamily>
    </columnFamilies>
</table>
```

As an example, a user may issue the following query:
SELECT feature, SUM(transactions)
FROM product_metrics
WHERE organization_id=?
AND date >=?
AND date <=?
AND cloud =?
GROUP BY feature In response to receiving the query, the query can be compiled into a query plan that can be executed to determine results that are then returned to the user. As illustrated in FIG. 1, the query can be based on the following keys (110): Organization (Org_ID), Date, and/or Cloud & Features. Other keys can be used for other queries and/or other configurations.

In the example of FIG. 1, Org_ID and a date value can define a start key and Org_ID and a date value can define an end key. Cloud and/or Features can be used for filtering. In one embodiment, the query plan can be intercepted, for example, by a server-side coprocessor that builds a map of feature values and returns one aggregated row per distinct group.

The scan can be performed by specified values (120), for example, transactions, unique users and/or response time. Other values can also be supported. This information is used to create a scan of the non-relational database (e.g. HBase) data. In one embodiment, the scans can be executed in parallel for each row key range. As a result, the latency of the queries can be relatively low to allow the non-relational database data to drive analytic-type queries over large amounts of data. This can be hidden behind a JDBC driver, for example. In one embodiment, the non-relational database is part of a multitenant database environment.

Figure 2:
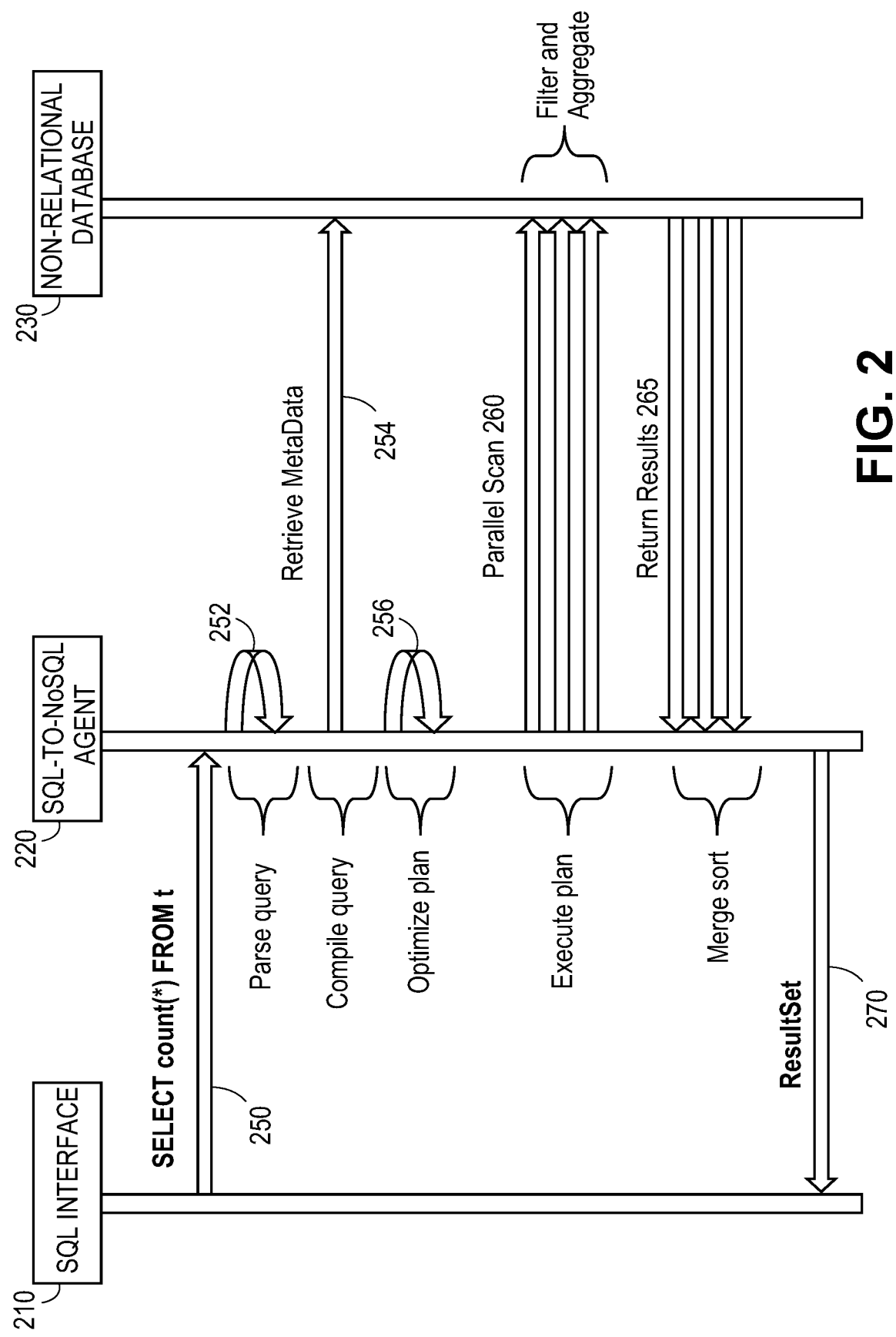
FIG. 2 is an interaction diagram of one embodiment of a technique for querying a NoSQL database using SQL commands.

FIG. 2 is an interaction diagram of one embodiment of a technique for querying a NoSQL database using SQL commands. In one embodiment, the technique of FIG. 2 is performed as described above within a multitenant database environment.

SQL interface 210 is any type of interface/client device that can be used to receive SQL commands and provide results form the SQL commands. For example, SQL interface 210 can be a SQL application running on a client computing device. SQL-to-NoSQL agent 220 provides the functionality described herein. SQL-to-NoSQL agent 220 may be a centralized single agent or can be distributed over multiple entities. Various example architectures are described below with respect to FIGS. 3 and 4. Non-relational database 230 can be any type of non-relational database, for example, HBase.

In response to receiving at least one SQL command representing a query, SQL interface 210 sends the query, 250, to SQL-to-NoSQL agent 220. In response to receiving the SQL command, SQL-to-NoSQL agent 220 parses the query, 252. SQL-to-NoSQL agent 220 then compiles a query, which can include retrieving metadata, 254, from non-relational database 230. The query plan can be optimized, 256. In one embodiment, the SQL query is transformed into one or more scans that are relatively simple, for example, with no joins, basic filtering and/or simple aggregation.

In one embodiment, the scans can be run on a sub-section of tables so that not all tables need to be replicated in the non-relational database. In some embodiments, the results need only be approximately correct. Other optimizations can be utilized to provide the desired level of performance.

The query plan can be executed as multiple parallel scans, 260, of non-relational database 230. In one embodiment, a set of HBase (or other non-relational database) scans that can be executed in parallel for each row key range. In one embodiment, these scans are executed in parallel for each row key range and can be combined to provide results of the query.

In one embodiment, non-relational database 230 can perform filtering and/or aggregation. Results of the multiple parallel scans are returned, 265, to SQL-to-NoSQL agent 220. In one embodiment, SQL-to-NoSQL agent 220 can perform merge sorting on the results. By combining the results of the one or more scans, the system can provide an aggregated/unified result to the original SQL query. The results are provided, 270, to SQL interface 210.

Figure 3:
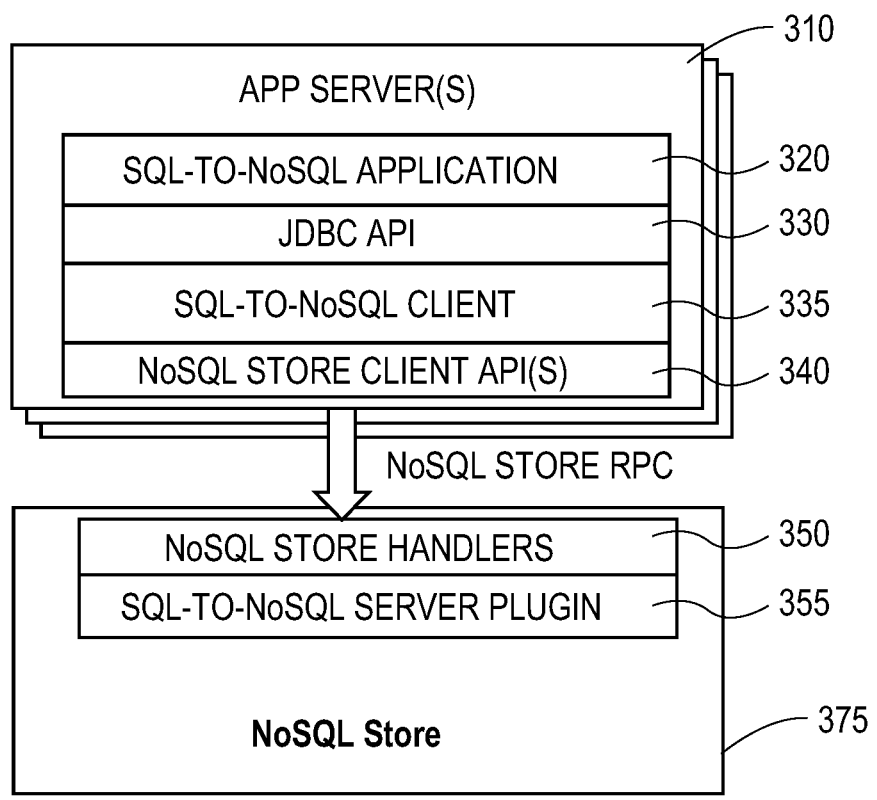
FIG. 3 is a block diagram of an architecture that provides a querying of a NoSQL database using SQL commands via an embedded JDBC driver.

FIG. 3 is a block diagram of an architecture that provides a querying of a NoSQL database using SQL commands via an embedded JDBC driver. In the example architecture of FIG. 3, the SQL-to-NoSQL agent is embedded in an application server and operates in conjunction with a SQL-to-NoSQL server plugin in the non-relational database.

In the example of FIG. 3, one or more application server(s) 310 can run SQL-to-NoSQL application 320 to provide access to NoSQL store 375. In one embodiment, SQL-to-NoSQL application 320 includes JDBC API 330 that provides an interface to SQL-to-NoSQL client 335. In one embodiment, SQL-to-NoSQL client 335 translates SQL commands received by SQL-to-NoSQL application 320 to multiple NoSQL scans as described above.

The multiple NoSQL scans are passed through NoSQL Store client API(s) 340 that operates to pass the multiple NoSQL scans to NoSQL store handlers 350 via one or more NoSQL store remote procedure calls (RPCs). The multiple NoSQL scans are then utilized by SQL-to-NoSQL plugin 355 to run the scans in NoSQL store 375. Results of the scans are then sent back through the same protocol to SQL-to-NoSQL application 320.

Figure 4:
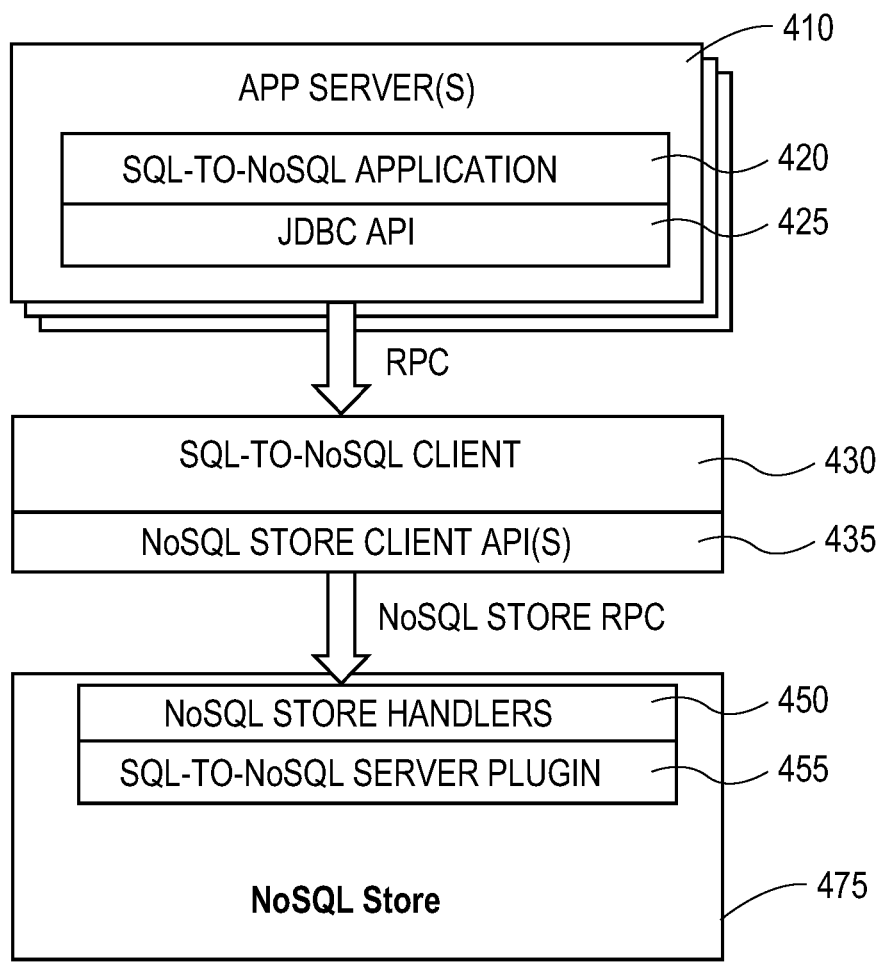
FIG. 4 is a block diagram of an architecture that provides querying of a NoSQL database using SQL commands via a remote JDBC driver.

FIG. 4 is a block diagram of an architecture that provides querying of a NoSQL database using SQL commands via a remote JDBC driver. In the example of FIG. 4, one or more application server(s) 410 can run SQL-to-NoSQL application 420 to provide access to NoSQL store 475. In one embodiment, SQL-to-NoSQL application 420 includes JDBC API 425 that provides an interface to SQL-to-NoSQL client 430.

In one embodiment, SQL-to-NoSQL client 430 translates SQL commands received by SQL-to-NoSQL application 420 to multiple NoSQL scans as described above. The multiple NoSQL scans are passed through NoSQL Store client API(s) 435 that operates to pass the multiple NoSQL scans to NoSQL store handlers 450 via one or more NoSQL store RPCs. The multiple NoSQL scans are then utilized by SQL-to-NoSQL plugin 455 to run the scans in NoSQL store 475. Results of the scans are then sent back through the same protocol to SQL-to-NoSQL application 420.

Figure 5:
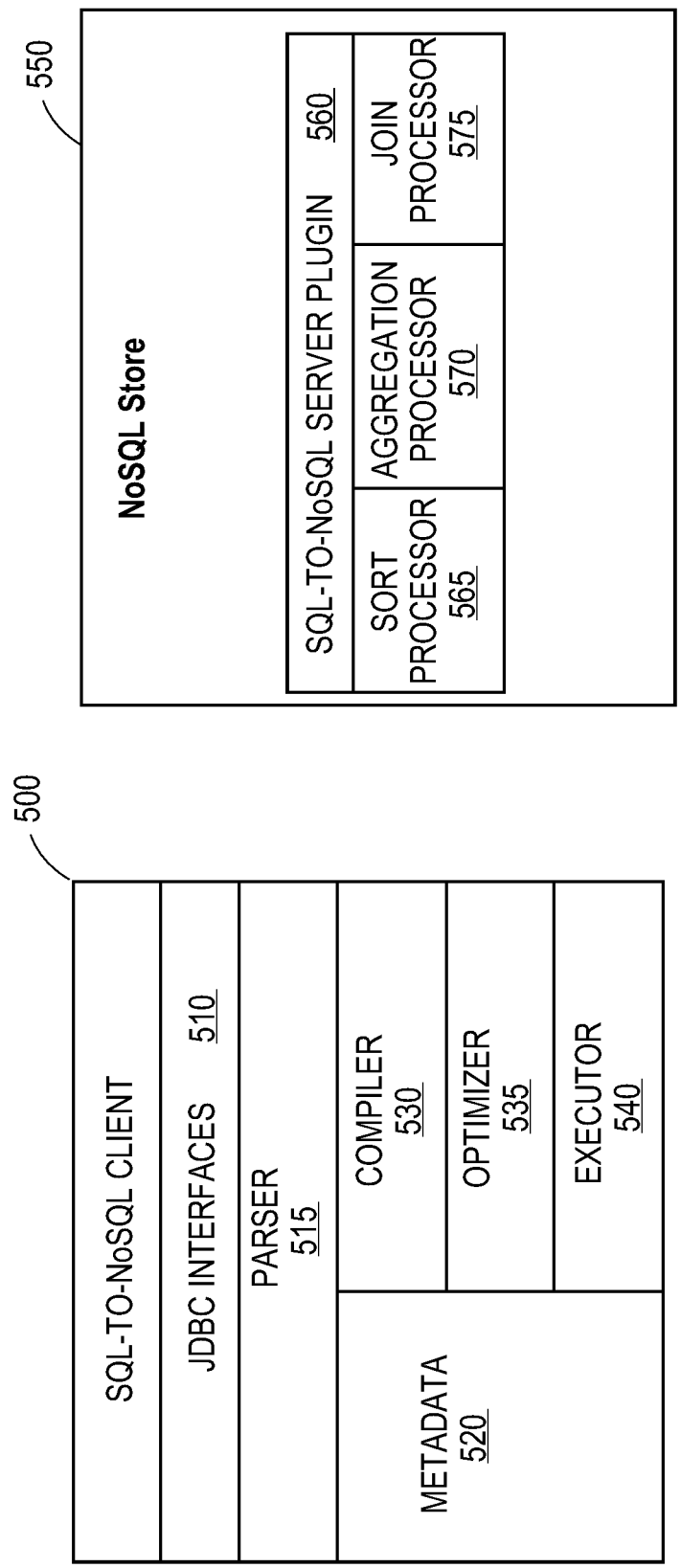
FIG. 5 is a block diagram of an architecture that provides querying of a NoSQL database using SQL commands via a client agent.

FIG. 5 is a block diagram of an architecture that provides querying of a NoSQL database using SQL commands via a client agent. SQL-to-NoSQL client 500 can operate as described above. In one embodiment, SQL-to-NoSQL client 500 includes JDBC interface 510 that can be utilized to support low-latency SQL queries to run over the data stored in the non-relational database (e.g., HBase).

In one embodiment, parser 515 operates to transform the SQL queries into a set of HBase (or other non-relational database) scans that can be executed in parallel for each row key range. In one embodiment, these scans are executed in parallel for each row key range and can be combined to provide results of the query. As a result, the latency of the queries is low enough to allow data to drive analytic-type queries over large amounts of data.

Metadata 520 is data associated with the parsing of the SQL queries and conversion of the queries to NoSQL scans. Compiler 530 operates to compile the multiple NoSQL scans to be performed on data in NoSQL store 550. In one embodiment, compiler 530 supports parallel scans. Optimizer 535 operates to optimize the NoSQL scans compiled by compiler 530. In one embodiment, optimizer 535 optimizes scans for parallel operation. Optimizer 535 may optimize based on ordering and/or other considerations. Executor 540 causes the scans to be transmitted to and/or executed on data in NoSQL store 550.

NoSQL store 550 can be any type of non-relational database. In one embodiment, NoSQL store 550 includes SQL-to-NoSQL plugin 560 that receives the scans from NoSQL store 550. In one embodiment, SQL-to-NoSQL plugin 560 includes sort processor 565, aggregation processor 570 and join processor 575.

In one embodiment, sort processor 565 operates to sort results from the multiple NoSQL scans. In one embodiment, aggregation processor 570 operates to aggregate the results form the multiple NoSQL scans. This can be performed before or after sorting by sort processor 565. In one embodiment, join processor 575 operates to join results from the multiple NoSQL scans. The sorted, aggregated and/or joined results are passed back to SQL-to-NoSQL client 500.

Figure 6:
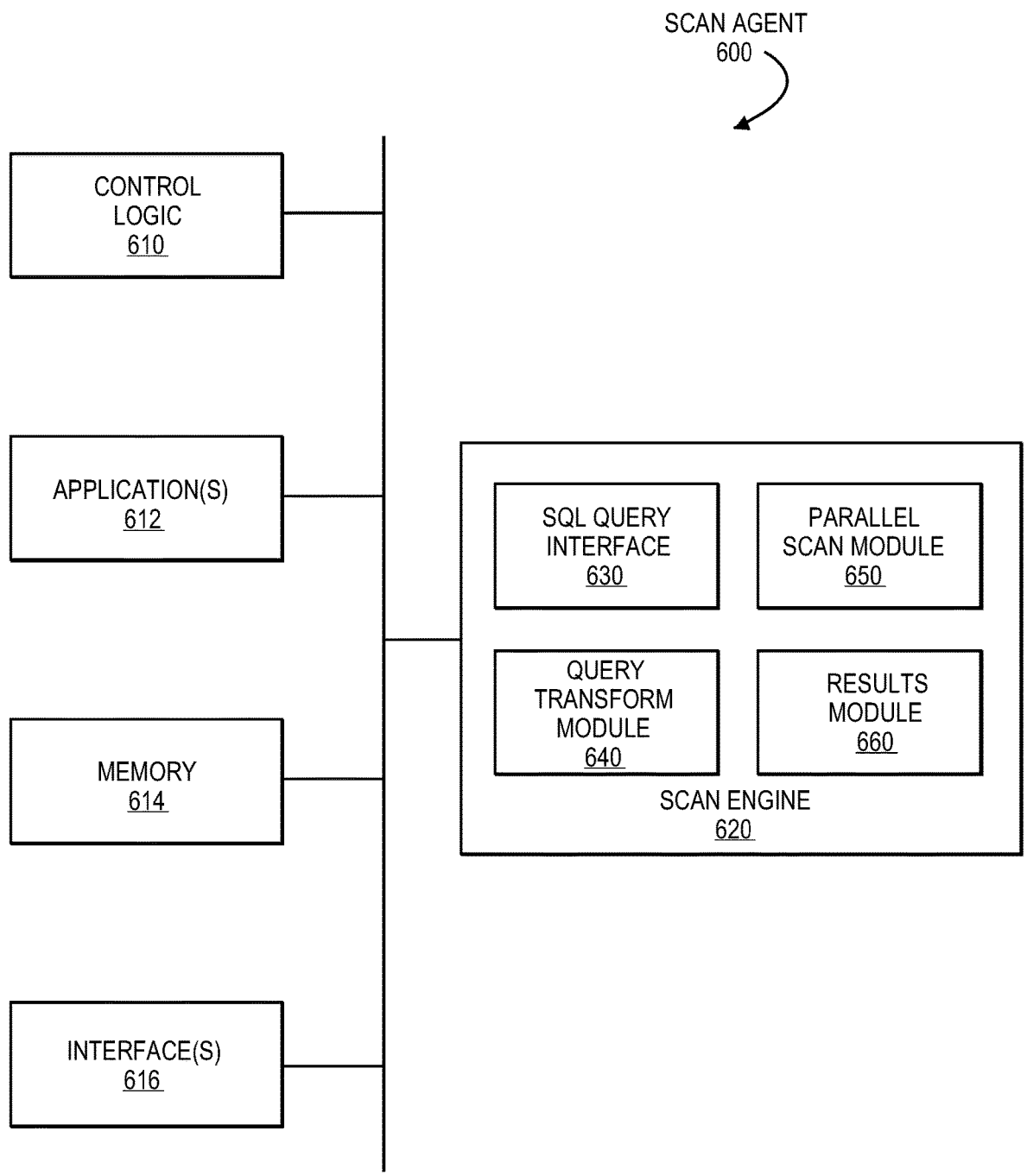
FIG. 6 is a block diagram of one embodiment of an agent to provide querying of NoSQL databases using SQL commands.

FIG. 6 is a block diagram of one embodiment of an agent to provide querying of NoSQL databases using SQL commands. The agent of FIG. 6 can provide the functionality described above. For example, the agent of FIG. 6 can be the NoSQL client. In one embodiment, the agent of FIG. 6 can be part of a multitenant database environment.

In one embodiment, SQL-to-NoSQL agent 600 includes control logic 610, which implements logical functional control to direct operation of SQL-to-NoSQL agent 600, and/or hardware associated with directing operation of SQL-to-NoSQL agent 600. Logic may be hardware logic circuits and/or software routines. In one embodiment, SQL-to-NoSQL agent 600 includes one or more applications 612, which represent a code sequence and/or programs that provide instructions to control logic 610.

SQL-to-NoSQL agent 600 includes memory 614, which represents a memory device and/or access to a memory resource for storing data and/or instructions. Memory 614 may include memory local to SQL-to-NoSQL agent 600, as well as, or alternatively, including memory of the host system on which SQL-to-NoSQL agent 600 resides. SQL-to-NoSQL agent 600 also includes one or more interfaces 616, which represent access interfaces to/from (an input/output interface) SQL-to-NoSQL agent 600 with regard to entities (electronic or human) external to SQL-to-NoSQL agent 600.

SQL-to-NoSQL agent 600 also includes SQL-to-NoSQL engine 620, which represents one or more functions or module that enable SQL-to-NoSQL agent 600 to provide the SQL-to-NoSQL functionality as described above. The example of FIG. 6 provides several modules that may be included in SQL-to-NoSQL engine 620; however, different and/or additional modules may also be included. Example modules that may be involved in providing the SQL-to-NoSQL functionality include SQL query interface 630, query transform module 640, parallel scan module 650, and/or results module 660. Each of these modules may further include other sub-modules to provide other functions. As used herein, a module refers to routine, a subsystem, logic circuit, microcode, etc., whether implemented in hardware, software, firmware or some combination thereof.

In one embodiment, SQL query interface 630 provides an interface (e.g., application programming interface, API) that functions to receive SQL queries from sources external to SQL-to-NoSQL agent 600. SQL query interface 630 can receive SQL queries and provide results in appropriate format(s) upon completion of the scan(s). SQL query interface 630 can be implemented in hardware, software, firmware or some combination thereof.

Query transform module 640 functions to transform the SQL query into multiple NoSQL scans. In one embodiment, query transform module 640 operates to parse the SQL statement, compile it into a query plan to be executed as multiple parallel scans. Query transform module 640 can be implemented in hardware, software, firmware or some combination thereof.

Parallel scan module 650 functions to cause the multiple NoSQL scans to be performed in parallel, if possible. Parallel scan module 650 can distribute the scans and manage any dependencies between scans. Parallel scan module 650 can be implemented in hardware, software, firmware or some combination thereof.

Results module 660 functions to collect results from the parallel scans and combines the results into a single aggregated result. The aggregated result can be provided to SQL query interface 630, which can return the result of the SQL query. Results module 660 can be implemented in hardware, software, firmware or some combination thereof.

Figure 7:
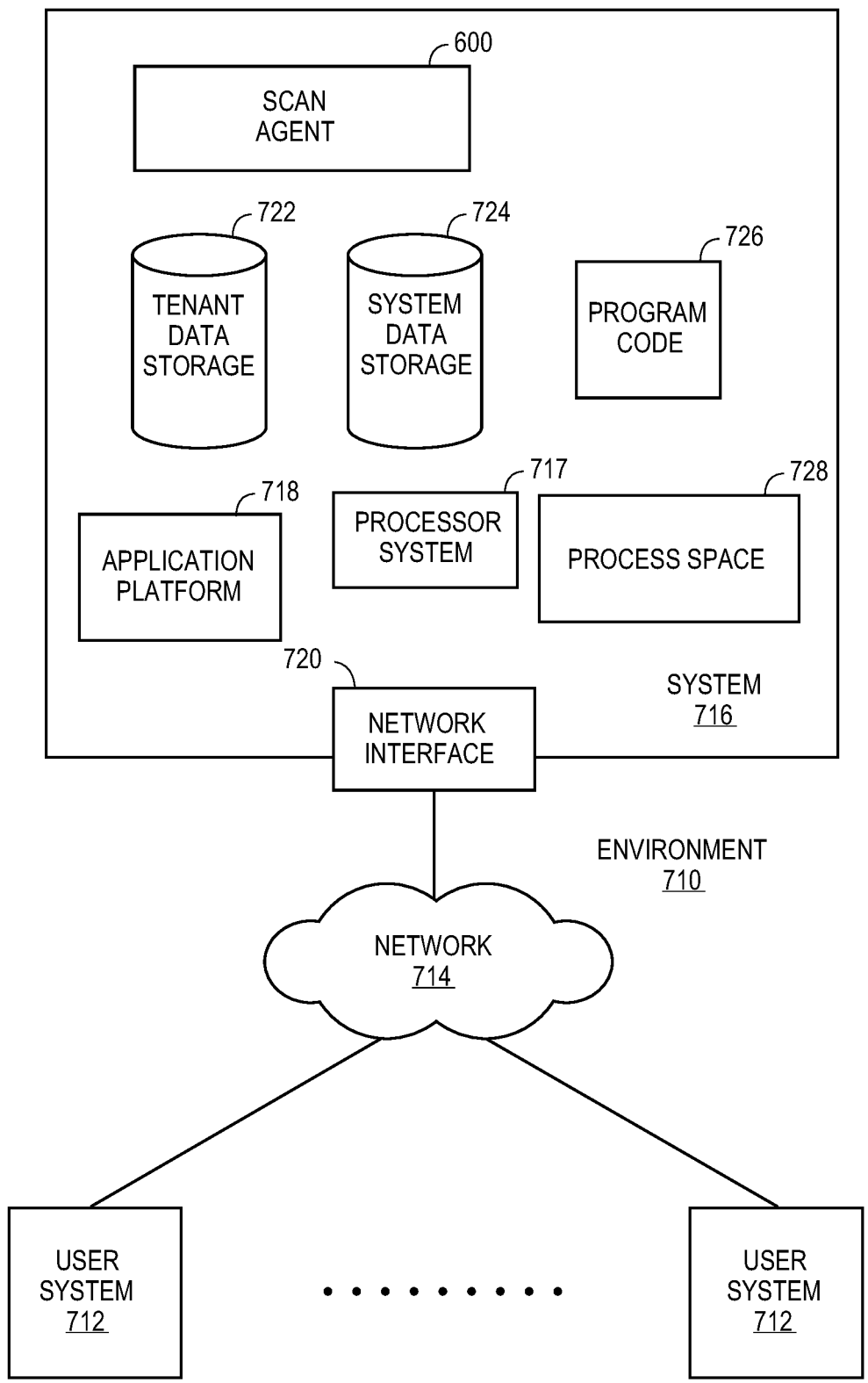
FIG. 7 is a block diagram of one embodiment of a multitenant environment.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects.

A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that might be used are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714.

Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

Computer code can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
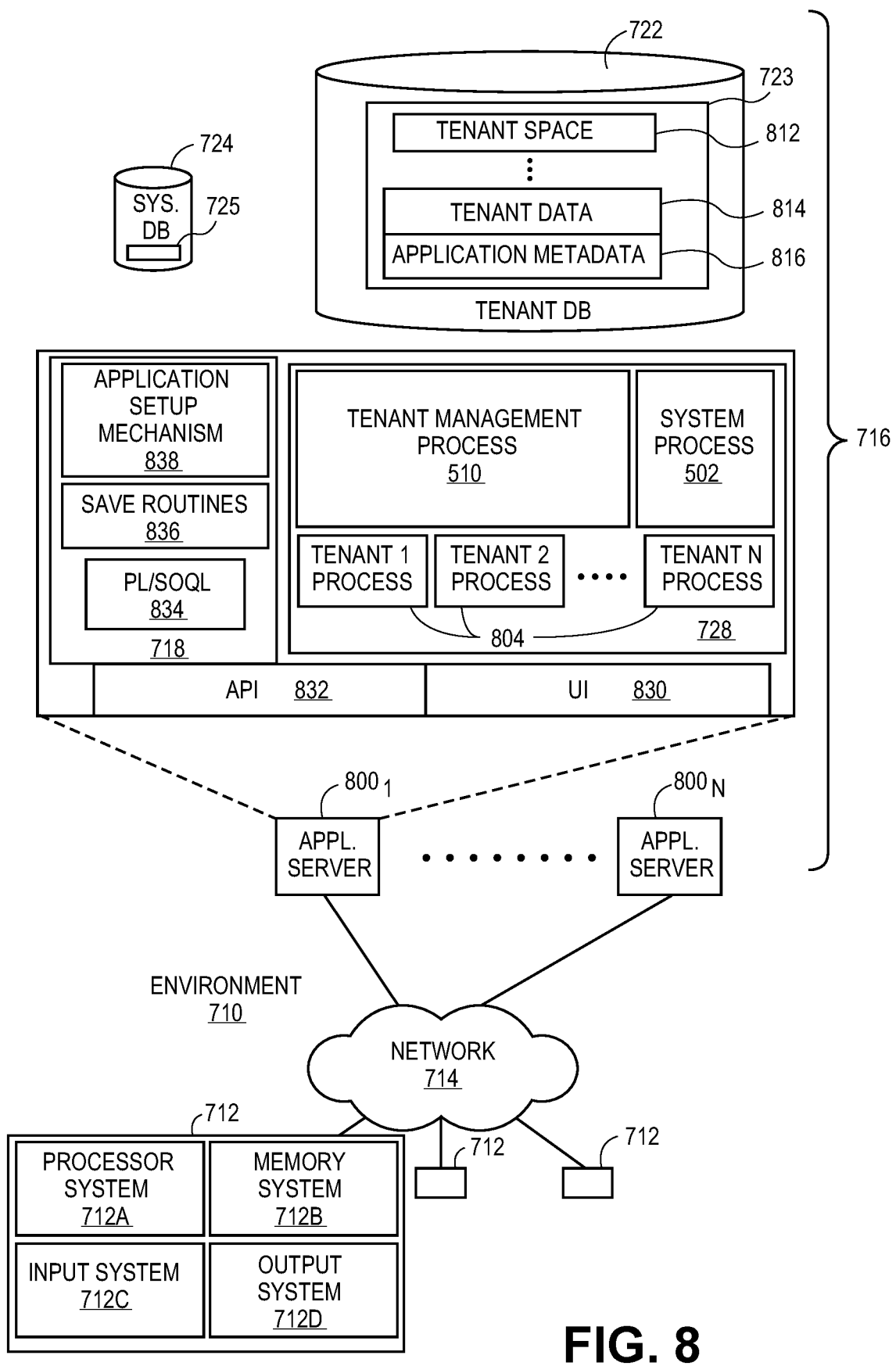
FIG. 8 is a block diagram of one embodiment of a multitenant database environment.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks.

As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712.

The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832.

A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800i might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800.

In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing predefined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with at least one embodiment. The appearances of the phrase "in one embodiment" in various places in the specification are not necessarily all referring to the same embodiment. The description is thus to be regarded as illustrative instead of limiting.

What is claimed is:

1. A method comprising:
receiving, with a Structured Query Language (SQL)-to-Non-Structured Query Language (NoSQL) agent, a SQL query, wherein the SQL query is received through a SQL application programming interface (API) at a first architectural level;
transforming, with the SQL-to-NoSQL agent, the SQL query into a set of one or more non-relational database scans having associated row key ranges and having no joins in the set utilizing a map of feature values;
sending, with the SQL-to-NoSQL agent, the set of one or more non-relational database scans having no joins with instructions for execution in parallel for each row key range to the non-relational database through a second API at a second architectural level that is lower than the first architectural level;
causing results from the set of one or more non-relational database scans to be joined;
receiving, with the SQL-to-NoSQL agent, results from the set of one or more non-relational database scans through the second API;
performing, with the SQL-to-NoSQL agent, merge sorting on the received results from the set of one or more non-relational database scans to generate combined results to provide an aggregate result to the SQL query; and
transmitting, with the SQL-to-NoSQL agent, the aggregated result as results of the SQL query through the SQL API.

2. The method of claim 1 wherein the non-relational database comprises a non-relational distributed database.

3. The method of claim 1 wherein the SQL-to-NoSQL agent operates to pass multiple NoSQL scans through multiple remote procedure calls (RPCs).

4. The method of claim 1 wherein the non-relational database is part of a multitenant database environment.

5. The method of claim 1 further comprising receiving a schema for data in the non-relational database.

6. The method of claim 5 wherein the SQL query language is used to manage the schema for the data in the non-relational database.

7. The method of claim 1 further comprising generating a query plan with a server-side component that builds a map of feature values and returns one aggregated row per query key.

8. A non-transitory computer-readable medium having stored thereon instructions that, when executed, are configurable to cause one or more processors to:
receive, with a Structured Query Language (SQL)-to-Non-Structured Query Language (NoSQL) agent, a SQL query, wherein the SQL query is received through a first application programming interface (API) at a first architectural level;
transform, with the SQL-to-NoSQL agent, the SQL query into a set of one or more non-relational database scans having associated row key ranges and having no joins in the set by building a map of feature values;
send, with the SQL-to-NoSQL agent, the set of one or more non-relational database scans having no joins with instructions for execution in parallel for each row key range to the non-relational database through a second API at a second architectural level that is lower than the first architectural level;
cause results from the set of one or more non-relational database scans to be joined;
receive, with the SQL-to-NoSQL agent, results from the set of one or more non-relational database scans through the second API;
perform, with the SQL-to-NoSQL agent, merge sorting on the received results from the set of one or more non-relational database scans to generate combined results to provide an aggregate result to the SQL query; and
transmit, with the SQL-to-NoSQL agent, the aggregated result as results of the SQL query through the first API.

9. The non-transitory computer-readable medium of claim 8 wherein the non-relational database comprises a non-relational distributed database.

10. The non-transitory computer-readable medium of claim 8 wherein the SQL-to-NoSQL agent operates to pass multiple NoSQL scans through multiple remote procedure calls (RPCs).

11. The non-transitory computer-readable medium of claim 8 wherein the non-relational database is part of a multitenant database environment.

12. The non-transitory computer-readable medium of claim 8 further comprising instructions that, when executed by the one or more processors, cause the one or more processors to receive a schema for data in the non-relational database.

13. The non-transitory computer-readable medium of claim 12 wherein the SQL query language is used to manage the schema for the data in the non-relational database.

14. The non-transitory computer-readable medium of claim 7 further comprising instructions that, when executed by the one or more processors, are configurable to cause the one or more processors to generate a query plan with a server-side component that builds a map of feature values and returns one aggregated row per query key.

15. A system comprising:
one or more interfaces to communicate with one or more user systems;
a server system having one or more hardware processors communicatively coupled with the one or more user systems via a network through the one or more interfaces, the server system to receive, with a Structured Query Language (SQL)-to-Non-Structured Query Language (NoSQL) agent, a SQL query, wherein the SQL query is received through a first application programming interface (API) at a first architectural level, to transform, with the SQL-to-NoSQL agent, the SQL query into a set of one or more non-relational database scans having associated row key ranges and having no joins in the set by building a map of feature values, to send, with the SQL-to-NoSQL agent, the set of one or more non-relational database scans having no joins with instructions for execution in parallel for each row key range to the non-relational database through a second API at a second architectural level that is lower than the first architectural level, to cause results from the set of one or more non-relational database scans to be joined, to receive, with the SQL-to-NoSQL agent, results from the set of one or more non-relational database scans through the second API, to perform, with the SQL-to-NoSQL agent, merge sorting on the received results from the set of one or more non-relational database scans to generate combined results to provide an aggregate result to the SQL query, and to transmit, with the SQL-to-NoSQL agent, the aggregated result as results of the SQL query through the first API.

16. The system of claim 15 wherein the non-relational database comprises a non-relational distributed database.

17. The system of claim 15 wherein the non-relational database is part of a multitenant database environment.

18. The system of claim 15 further to cause the one or more processors to receive a schema for data in the non-relational database.

19. The system of claim 18 wherein the SQL query language is used to manage the schema for the data in the non-relational database.

20. The system of claim 15 wherein the server system is further configurable to generate a query plan with a server-side component that builds a map of feature values and returns one aggregated row per query key.

* * * * *